(12) United States Patent  
Maeckel et al.

(10) Patent No.: US 8,429,674 B2
(45) Date of Patent: Apr. 23, 2013

(54) MAINTAINING DATA STATES UPON FORCED EXIT

(75) Inventors: Clay Maeckel, San Jose, CA (US); Christopher Crim, San Jose, CA (US)

(73) Assignee: Apple Inc., Cupertino, CA (US)

( * ) Notice: Subject to any disclaimer, the term of this patent is extended or adjusted under 35 U.S.C. 154(b) by 305 days.

(21) Appl. No.: 12/840,216

(22) Filed: Jul. 20, 2010

(65) Prior Publication Data

US 2012/0023506 A1 Jan. 26, 2012

(51) Int. Cl.
 G06F 9/44 (2006.01)
 G06F 15/16 (2006.01)
 G06F 11/00 (2006.01)
 H04M 1/00 (2006.01)

(52) U.S. Cl.
 USPC .......... 719/318; 455/556.2; 709/227; 714/15; 714/24; 714/38.13

(58) Field of Classification Search ............... 455/556.2; 709/227; 714/15, 24, 38.13; 719/318
See application file for complete search history.

(56) References Cited

U.S. PATENT DOCUMENTS

| 6,914,887 | B2* | 7/2005 | Idsinga .................. 370/255 |
| 7,634,583 | B2* | 12/2009 | Sagar et al. ................ 709/250 |
| 7,818,620 | B2* | 10/2010 | Nagano et al. ................ 714/34 |
| 2002/0038369 | A1* | 3/2002 | Sung et al. .................. 709/227 |
| 2005/0064891 | A1 | 3/2005 | Chaudry et al. |
| 2005/0111036 | A1 | 5/2005 | Takasaki et al. |
| 2008/0005121 | A1 | 1/2008 | Lam et al. |
| 2008/0113665 | A1* | 5/2008 | Paas et al. ................ 455/426.1 |
| 2008/0163050 | A1* | 7/2008 | Yamaji et al. ............... 715/700 |
| 2008/0254841 | A1 | 10/2008 | Miyata |
| 2008/0311853 | A1 | 12/2008 | Tamura |
| 2009/0063697 | A1* | 3/2009 | Fukao .................. 709/232 |
| 2010/0325287 | A1* | 12/2010 | Jagadeeswaran et al. .... 709/227 |

* cited by examiner

Primary Examiner — Charles E Anya
(74) Attorney, Agent, or Firm — Fish & Richardson P.C.

(57) ABSTRACT

Methods, program products, and systems of maintaining data states upon forced exit are disclosed. In one aspect, an application program executing on the mobile device can maintain a connection to a remote data store and retrieve and cache data from the data store. When the mobile device receives an event that forces the application program to terminate, the mobile device can provide a time window in which the mobile device can perform various state preservation actions. During the time window, the mobile device can store data states, including states of the connection and states of the cached data. When the application program is re-launched, the mobile device can use the stored data states to restore a connection and a displayed view.

20 Claims, 9 Drawing Sheets

MAINTAINING DATA STATES UPON FORCED EXIT

TECHNICAL FIELD

This disclosure relates generally to database application programs on a mobile device.

BACKGROUND

A mobile device, such as a smart phone or a tablet device, can execute various application programs that access one or more data stores. The application programs can include, for example, a database reporting program that is configured to display a formatted view of data stored in the one or more data stores, or a database editing program that is configured to update the data in the one or more data stores. The data stores can be hosted on server computers that are located remotely from the mobile device. For the application programs to access the data stores, the mobile device can utilize one or more connections to the data stores through a communications network.

A mobile device can include various features that can force an application program to terminate. For example, a mobile device can include a "home" button that, when pressed, causes a display screen to switch immediately from displaying content of the application program to displaying a system screen or to displaying an output of a second application program. After the switch, the application program can exit. The mobile device can switch display content without providing a prompt for a user to save data currently being viewed or edited, or states of the data. If the application program is a database reporting program or database editing program that is currently connected to a data store, the current connection can be terminated, and states of the connection lost.

SUMMARY

Methods, program products, and systems of maintaining data states upon forced exit are disclosed. In one aspect, an application program executing on the mobile device can maintain a connection to a remote data store and retrieve and cache data from the data store. When the mobile device receives an event that forces the application program to terminate, the mobile device can provide a time window in which the mobile device can perform various state-preservation actions. During the time window, the mobile device can store data states, including states of the connection and states of the cached data. When the application program is re-launched, the mobile device can use the stored data states to restore a connection and a displayed view.

In some implementations, a mobile device can receive an event to terminate one or more connections connecting the mobile device to one or more data stores. The event can correspond to a time window in which the mobile device can perform one or more actions to preserve data states. Within the time window, the mobile device can store states of at least one of the one or more connections on a storage device. The mobile device can terminate the one or more connections before, during, and after storing the states.

These and other implementations can be utilized to achieve one or more of the following advantages. Maintaining data states upon forced exit can be utilized to provide a sense of consistency to the user. States of a currently open connection of an application program can be maintained even when the application program is forced to terminate. A user's current viewing states can also be maintained. When the application program re-launches, the mobile device can automatically display content that a user was viewing when the forced exit of an application program occurred, with data connection restored.

The techniques of maintaining data states upon forced exit can be utilized to reduce network traffic. Cached data and states of the cached data are stored on a mobile device upon forced exit of an application program that accesses data in remote data stores. Upon re-launching of the application program, only "dirty" data are retrieved from the remote data stores to the mobile device. Accordingly, a complete data download that may include data that are not dirty can be avoided, thus reducing network traffic.

The details of one or more implementations of techniques of maintaining data states upon forced exit of an application program are set forth in the accompanying drawings and the description below. Other features, aspects, and advantages of maintaining data states upon forced exit of an application program will become apparent from the description, the drawings, and the claims

BRIEF DESCRIPTION OF THE DRAWINGS

Like reference symbols in the various drawings indicate like elements.

DETAILED DESCRIPTION

Overview of Maintaining Data States Upon Forced Exit

Figure 1:
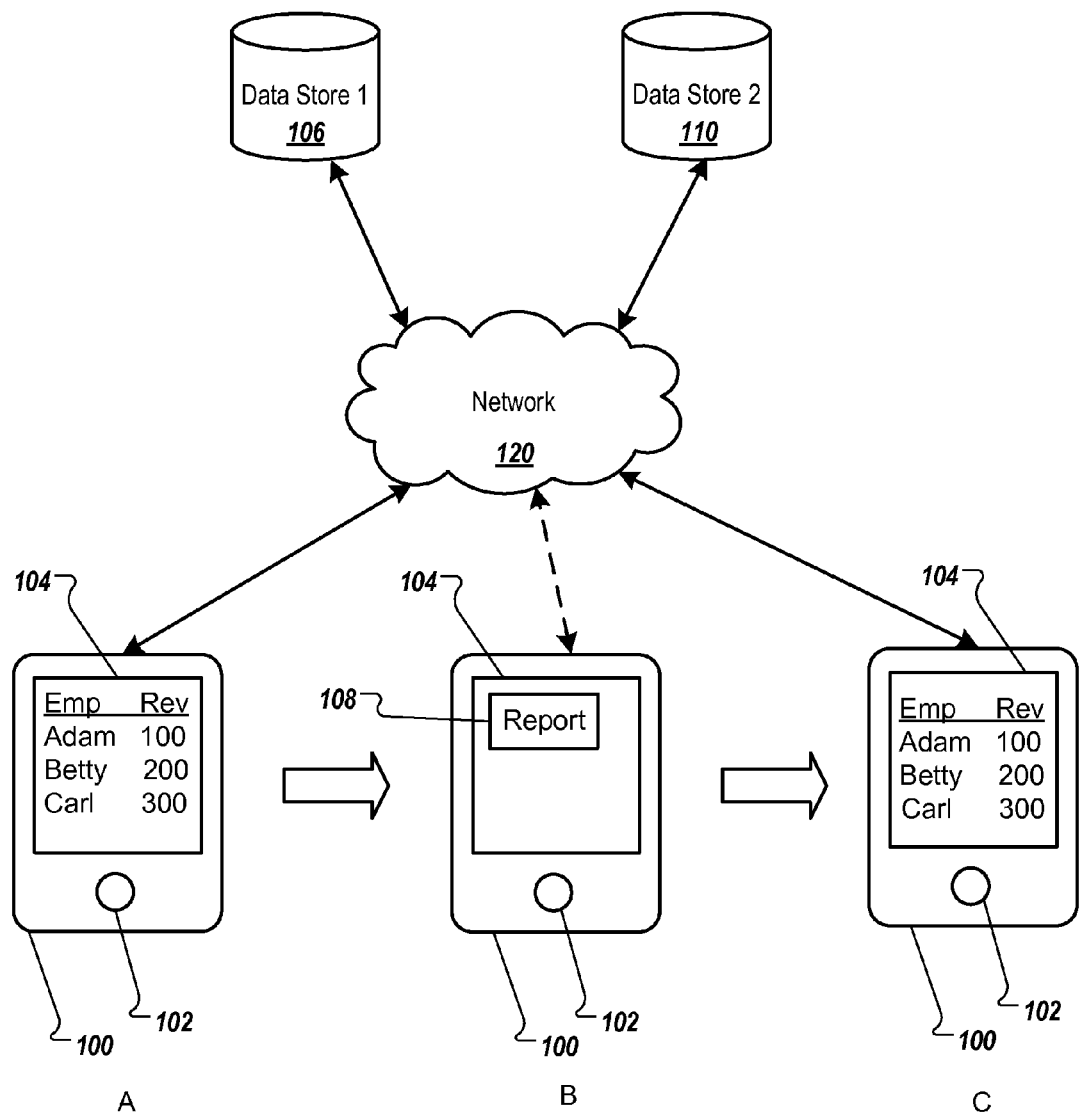
FIG. 1 illustrates exemplary techniques of maintaining data states upon a forced exit of an application program.

FIG. 1 illustrates exemplary techniques of maintaining data states upon a forced exit of an application program. For convenience, the techniques will be described in reference to mobile device 100 in various stages A, B, and C of maintaining data states.

At exemplary stage A, an exemplary application program currently executing on mobile device 100 can be forced to exit. The exemplary application program can be a database reporting program. The database reporting program can be configured to display data of a data store. For example, the database reporting program can display employee names under column heading "Emp" and revenue under column heading "Rev" associated with each employee name on display screen 104. The employee names and revenues can be stored as data fields or data records in data store 106 or data store 110 or both.

The database reporting program can access data in data store 106 and data store 110. Mobile device 100 can connect to data store 106 and data store 110 through communications network 120. The connection can be maintained on an as-needed basis, or while the database reporting program executes on mobile device 100.

While the database reporting program is connected to data store 106 and data store 110, an event can occur that forces the database reporting program to exit. In a forced exit, the database reporting program can lose control of display screen 104 immediately. The event can force the application program to terminate without providing a user interface that allows a user to save the current states of the connection and view.

The event can occur when particular data are being viewed in particular display settings. For example, the event can occur when a user is viewing data relating to employees Adam, Betty, and Carl. The event can be triggered by an input through control element 102. Control element 102 can have multiple functions. In some implementations, control element 102 can be a home button that, when pushed, forces an exit of an application program currently executing on mobile device 100. In some implementations, control element 102 can be a switch that, when activated for a specified period of time, turns on or off mobile device 100. Control element 102 is shown to be positioned at a lower middle front section of mobile device 100 for illustrative purposes. In various implementations, control element 102 can be positioned in any part of mobile device 100 (e.g., top, bottom, side, or back).

Upon receiving the event, mobile device 100 can provide a time window (e.g., a number of seconds) to the application program for cleaning up (e.g., release control of computing resources). The application program can utilize the time window as a grace period to save current data states. The time window can be provided by an operating system of mobile device. The time window can be defined by a length of time between the occurrence of the event and an actual time that the operating system revokes all resources provided to the application program (e.g., memory and CPU cycle), or any time period specified by user or system parameters. The actual termination time can be a time when the operating system revokes all resources provided to the application program (e.g., memory and CPU cycle), or any time period specified by user or system parameters. The actual termination time can be a time when the operating system shuts down, or a time when the operating system enters a "power save" or "sleep" mode.

During the time window, mobile device 100 can store one or more data states. The data states can include states of the connections between mobile device 100 and data stores 106 and 110. The states of the connections can include, for example, identifiers (e.g., host names) of data stores 106 and 110 and other connection parameters (e.g., port numbers, database identifiers, user names, and passwords) of the connection.

In some implementations, the data states can include data or references to cached data, including data currently being displayed on display screen 104. Cached data can include data retrieved from data stores 106 and 110 to mobile device 100 for current use (e.g., current display). For example, the data states can include references indicating that data relating to employees Adam, Betty, and Carl are being displayed. The data states can include metadata of the data being displayed, including, for example, a number of times that the data have been modified by various users. The data states can include display settings of the data that are currently being displayed on display screen 104. Mobile device 100 can terminate the connections before, during, or after the data states are stored. The application program can exit at the end of the time window.

At exemplary stage B, mobile device 100 can receive a request to restore the terminated connections and states of cached data. The request can result from, for example, a touch input to re-launch the application program received from display screen 104 upon a user touching icon 108 that is associated with the application program. In response to the request, mobile device 100 can reactivate the database reporting application program by providing various computing resources to the database reporting application program. The database reporting application program can retrieve the saved data states. Upon retrieving the saved states, the database reporting application program can examine the stored data states, restore the connections according to the stored data states, and update cached data when necessary. For example, the database reporting application program can identify one or more remote data stores to connect to, based on host names in the stored states, and connect to the data stores using connection parameters.

At exemplary stage C, upon restoring the connections, mobile device 100 can further restore a view of display screen 104 as when the event occurred. Some of the data can be retrieved from a cache on mobile device. Some of the data can be retrieved from data stores 106 and 110. Mobile device 100 can determine which portions of the data are to be retrieved from the cache and which from data stores 106 and 110 based on information indicating whether the data have been updated when the application program is not active. For example, based on the stored data states, mobile device 100 can determine that data relating to Carl has changed. Mobile device 100 can retrieve data related to Adam and Betty from cached data, and retrieve data related to Carl from data stores 106 and 110. Mobile device 100 can display the data using display setting stored in the data states.

Figure 2:
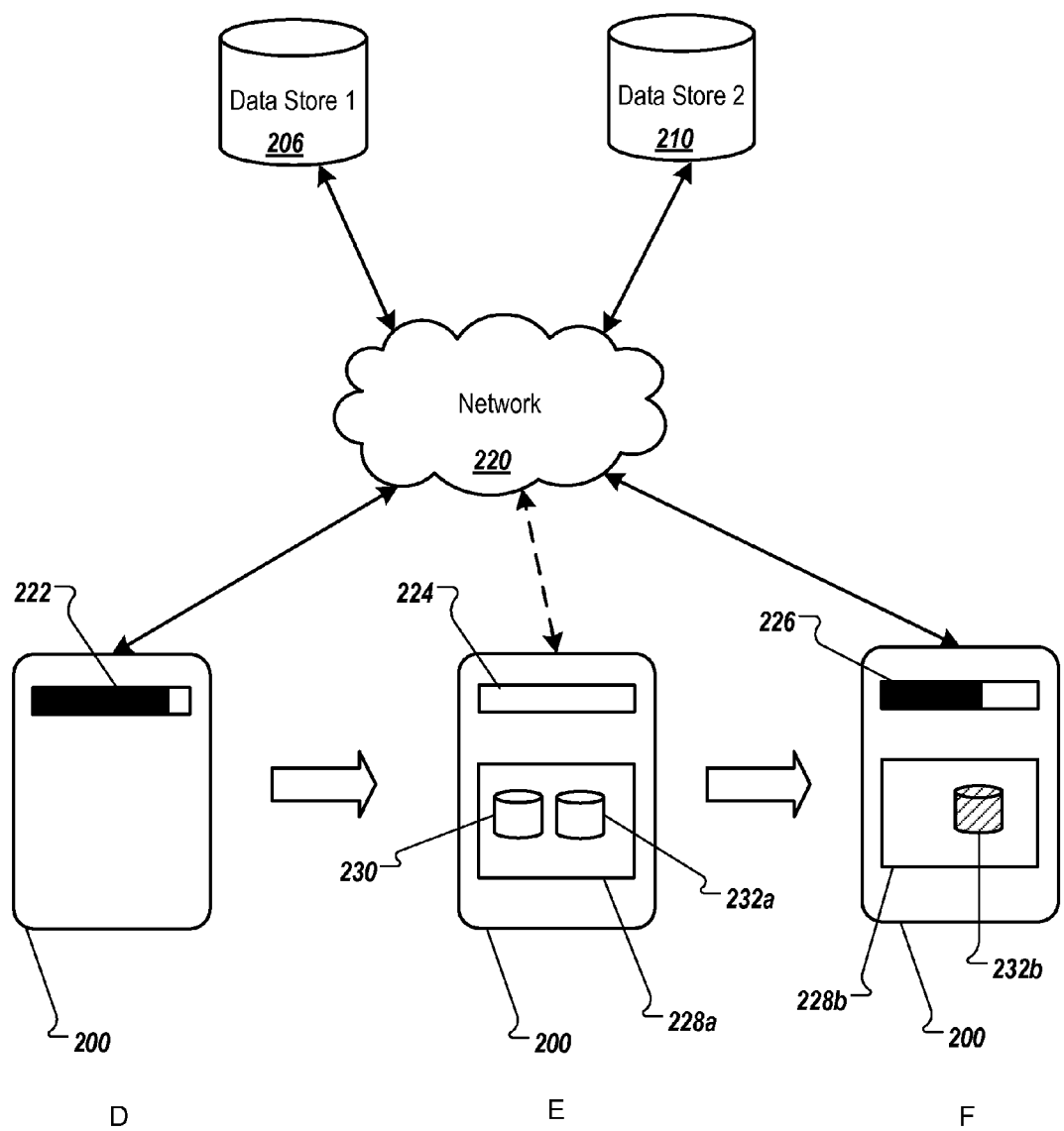
FIG. 2 illustrates exemplary techniques of maintaining data states upon a loss of connection to a data store.

FIG. 2 illustrates exemplary techniques of maintaining data states upon a loss of connection to a data store. The techniques will be described in reference to mobile device 200, which, like mobile device 100, can be an exemplary mobile device configured to implement the features and operations of maintaining data states upon a forced exit. For convenience, the techniques will be described in reference to mobile device 100 in various stages D, E, and F of maintaining data states.

Mobile device 200 can connect to data store 206 and data store 210 through communications network 220. Communications network 220 can include a wireless communications network. Mobile device 200 can be a mobile device that connects to communications network 220 wirelessly. To connect to communications network 220 wirelessly, mobile device 200 can utilize various wireless communication technologies. For example, mobile device 200 can connect to communications network 220 using Wi-Fi™ technologies or cellular communication technologies.

Mobile device 200 can communicate with data stores 206 and 210 by sending and receiving wireless signals. Strength of the wireless signals can vary. The variance can be due to various factors. For example, a change of distance between mobile device 200 and a wireless access point or a cellular tower of communications network 220 can cause the signal strength to change. Mobile device 200 can maintain a connection to communications network 220 and connections to data stores 206 and 210 if the signal strength satisfies a threshold.

For illustrative purposes, signal strength bars 222, 224, and 226 are used to indicate strength of wireless signals received by mobile device 200 at various stages. Signal strength bars 222, 224, and 226 can be graphic user interface (GUI) elements that can be displayed on a display screen of mobile device 200. Lengths of signal strength bars 222, 224, and 226 can indicate strengths of the wireless signal. A longer signal strength bar can indicate stronger wireless signal. If the signal strength fails to satisfy the threshold, a length of a signal strength bar can be zero.

For illustrative purposes, at exemplary stage D, mobile device 200 can be wirelessly connected to data stores 206 and 210. The signal strength is sufficiently strong such that data communications between mobile device 200 and data stores 206 and 210 can occur smoothly. The strong wireless signal is indicated by signal strength bar 222.

At exemplary stage E, the wireless signals can weaken sufficiently such that the wireless signals fail to satisfy the threshold for maintaining a connection. For example, at exemplary stage E, mobile device 200 can move away from a wireless access point or a cellular tower, move into a place where metal objects interfere with the wireless signal (e.g., an elevator car), or move into a place difficult for wireless signals to reach (e.g., a basement of a building). As a result, signal strength bar 224 can have a length of zero.

In some implementations, mobile device 200 can proceed to save data states when the signal strength fails to satisfy the threshold signal strength. Mobile device 200 can identify states of the connections and states of cached data after the actual connections to data stores 206 and 210 are lost. Mobile device 200 can store the data states on a storage device, and provide a user interface indicating that connections have been lost.

In some implementations, mobile device 200 can estimate a time when the strength of the wireless signal will fail to satisfy the threshold signal strength for maintaining a connection. If a failure is imminent, (e.g., when the estimated time falls below a threshold value), mobile device 200 can determine that data states are to be saved, and proceed to collect and save the states. Estimating the time when the strength of the wireless signal will fail to satisfy the threshold signal strength can include measuring a rate of change (e.g., rate of decrease) in signal strength. Additionally or alternatively, a location-aware mobile device can estimate the time based on a current location of the mobile device, a known location of a wireless access point or cellular tower, and a speed of movement of the mobile device. The time when the strength of the wireless signal will fail to satisfy the threshold signal strength can be estimated based on an estimate of time the mobile device moves out of a communication range of the wireless access point or cellular tower.

The data states can be stored in an encrypted data structure 228a. Encrypted data structure 228a can include a file, a local or remote database record, an entry in a system log, or any other data structure. Data structure 228a can be encrypted in various ways, including encrypted using an encryption key that is generated based on a hardware profile of mobile device 200, to prevent data structure 228a from being copied to another device and used to make unauthorized connections to data stores 206 and 210.

Encrypted data structure 228a can include states of connection 230 and states of cached data 232a. States of connection 230 can include, for example, identifiers (e.g., host names, domain names, or IP addresses) of data stores 206 and 210, the connection parameters, and order of the connections. The order of the connections can be determined by one or more dependencies of the data stores. For example, a particular application program can require that mobile device 200 connect to data store 206 before connecting to data store 210. The order of the connections can be stored accordingly.

Encrypted data structure 228a can include states of cached data 232a. States of cached data 232a can include states of data cached on mobile device 200 when a forced exit event or a loss of connection event occurs. When an application program displays data retrieved from data stores 206 and 210, some data can be retrieved from data stores 206 and 210 and stored on a storage device (cache) local to mobile device 200. Thus, if a user browses through data stored in the cache, mobile device 200 need not send multiple requests to data stores 206 and 210. The cached data can be associated with metadata describing the states of the cached data. The metadata can include, for example, indicators on whether the cached data are shared data that can be updated by multiple users. If the cached data are shared data, the metadata can include an indicator indicating a number of times the data have been updated, time of each update, and an identifier of each user making the update. When the connections are restored, the states of cached data 232a can be used to determine what data in the cache need to be updated.

In some implementations, the states of cached data 232a can include one or more references to the data records or data fields being displayed on a display screen when the forced exit or loss of connection occurred. The states of cached data 232a can include whether a data record or data field is "dirty" (e.g., has been edited on mobile device 200).

The states of cached data 232a can include display settings of the data records or data fields when a forced exit event or a loss of connection event occurs. The display settings can include zoom factors (e.g., zoomed 125%), cursor positions, cursor shapes, and window layouts and relative positions.

At exemplary stage F, mobile device 200 can automatically re-establish the connections to data store 206 and data store 210 when the wireless signal becomes sufficiently strong again, as indicated by signal strength bar 226. Upon detecting that connection can be established, mobile device 200 can retrieve the saved date states, including states of connections 230 and states of cached data 232a from encrypted data structure 228a. Using the states of connections 230, mobile device 200 can re-establish the connections to data stores 206 and 210.

Upon re-establishing the connections, mobile device 200 can retrieve from data store 206 and 210 metadata that correspond to the cached data. The metadata can include information on whether data previous downloaded to and cached on mobile device 200 have been changed. Mobile device can compare the metadata retrieved from data store 206 and 210 and metadata retrieved from encrypted data structure 228a to determine if the cached data need to be updated. For example, if a modification count on a data record or data field as recorded in metadata retrieved from data store 206 and 210 differs from a modification count on the data record or data field as recorded in metadata retrieved from encrypted data structure 228a, mobile device 200 can determine that further editing by another user on the data record or data field has occurred after the data record or data field was cached. Mobile device 200 can refresh this data record or data field in the cache by downloading the data. Mobile device 200 can additionally or alternatively update the states of the cached data 232a into states of the cached data 232b. States of the cached data 232b can be stored in updated encrypted data structure 228b. In some implementations, states of the cached data 232b can be updated in real time. For example, a modification count on a data record or data field, as stored in states of the cached data 232b, can be updated when another user updates the data record or data field on data store 206 or data store 210.

Mobile device 200 can additionally or alternatively determine if a conflict exists based on states of cached data 232a. A conflict can exist when, for example, a shared data record or data field is edited on mobile device 200 and marked as dirty, and the modification count from the data stores 106 and 110 and modification count as recorded in cached data 232a do not match one another. The conflict can occur when connections to the data stores 206 and 210 are lost before the edit by user of mobile device 200 is committed, and other users edited the same shared data record or data field when the connection was lost. When a conflict exists, mobile device 200 can provide a user interface and prompt the user to resolve the conflict.

Mobile device 200 can present data on a display device in the same manner as the data were displayed at time when the forced exit occurred or when connections to the data stores were lost. Presenting the data in the same manner as the data were displayed can include presenting the data using the display settings at time when the connection to the data stores are lost, as saved in encrypted data structure 228a. The display settings can include zoom factor, cursor position, cursor type, etc.

Exemplary Time Line of Maintaining Data States Upon Forced Exit

Figure 3:
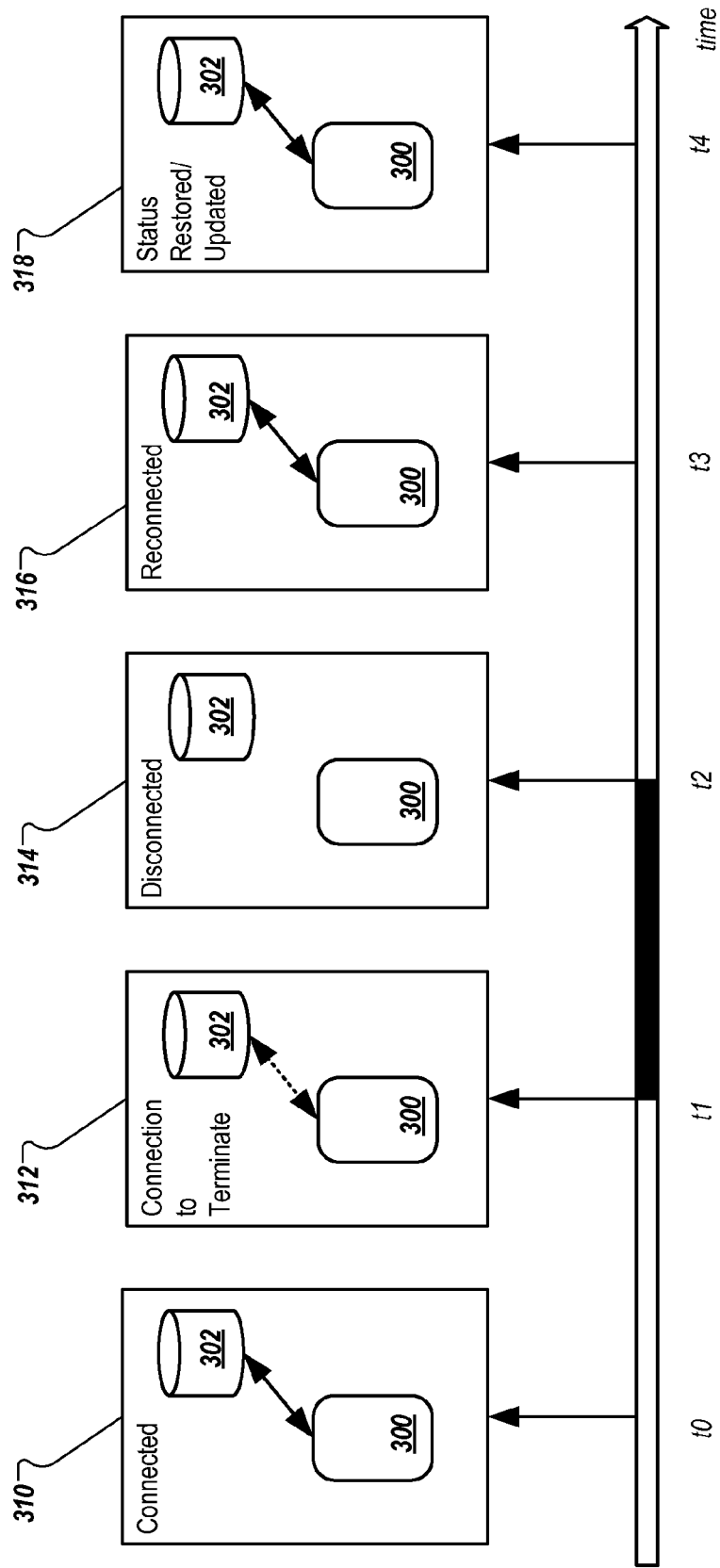
FIG. 3 illustrates a timeline of events that occur in maintaining data states upon a forced exit of an application program.

FIG. 3 illustrates an exemplary timeline of events that occur in maintaining data states upon a forced exit. Various event stages 310, 312, 314, 316, and 318 of mobile device 300, data store 302, and connection between mobile device 300 and data store 302 are shown along the exemplary time line.

At time to, mobile device 300 can be connected to data store 302. The connection can be facilitated through a communications network. An application program on mobile device 300 can access data stored on data store 302. At least a portion of the accessed data can be stored locally on mobile device 300 in a data cache.

At time t1, mobile device 300 receives an event to terminate the connection between mobile device 300 and data store 302. The event can include, for example, a forced exit of the application program, a power off of mobile device 300, a low battery event that indicates mobile device 300 will be shut down automatically due to low battery reserve, a weakening or loss of wireless communications signal, and unplugging of a wired networking connector (e.g., a network cable) from mobile device 300.

The event can correspond to a time window (e.g., a time window between t1 and t2). The time window can be defined by an operating system of mobile device 300, configured by user, or determined by other factors. These factors can include, for example, estimated time until wireless signals will fail to satisfy a threshold, or estimated time until the battery will fail to supply sufficient voltage or current to mobile device 300. Within the time window, an application program can perform actions to store data states in an encrypted data structure.

In the time window, the connection can have various states, as represented by the dashed arrow between mobile device 300 and data store 302 as shown in event stage 312. In some implementations, the connection can be terminated at time t1. In some implementations, the connection can be terminated at time t2, or any time between t1 and t2. The time window may not be sufficiently wide to allow all data states to be identified, retrieved, or stored. Mobile device 300 can attempt to store a maximum number of data states during the time window.

At time t3, the application program can be re-launched. The connection between mobile device 300 and data store 302 can be restored. Restoring the connection can include retrieving connection states stored upon the forced exit. For example, mobile device 300 can identify an IP address associated with data store 302 and attempt to connect to that IP address. In some implementation, restoring the connection can include tiered attempts if a first attempt fails. For example, if an attempt to connect to a data store represented by a particular IP address fails, mobile device 300 can attempt to connect to the data storing using a hostname (e.g., "janes-server"), which can be a label that is assigned to a device of a communications network and is used to identify the device. The hostname can be a domain name (e.g., "janes-server.my-company.com") recognizable by a domain name system (DNS). Restoring the connection can additionally include attempting to connect to data store 302 using the stored parameters including port number, database name, user name, and password.

In some implementations, restoring the connection can include attempting to restore a spooled connection using a connection identifier. Mobile device 300 can store a connection identifier of a connection to data store 302 as part of the connection states. The connection identifier can be a string or numeric value provided by data store 302 that uniquely identifies a connection stored in a connection pool, which can be a cache of database connections maintained so that the connections can be reused when future requests to the database are requested. Mobile device 300 can attempt to restore the connection using the stored connection identifier.

At time t4, mobile device 300 can restore a display according to display settings at time t1. Restoring the display can include providing for display data that were displayed at time t1 using the settings at time t1. Cached data can be updated if updates on data store 302 exist. One or more conflict resolution prompts can be displayed if an uncommitted local edit and an update on data store 302 exists. The cursor position can be restored.

Exemplary User Interface of Maintaining Data States Upon Forced Exit

Figure 4B:
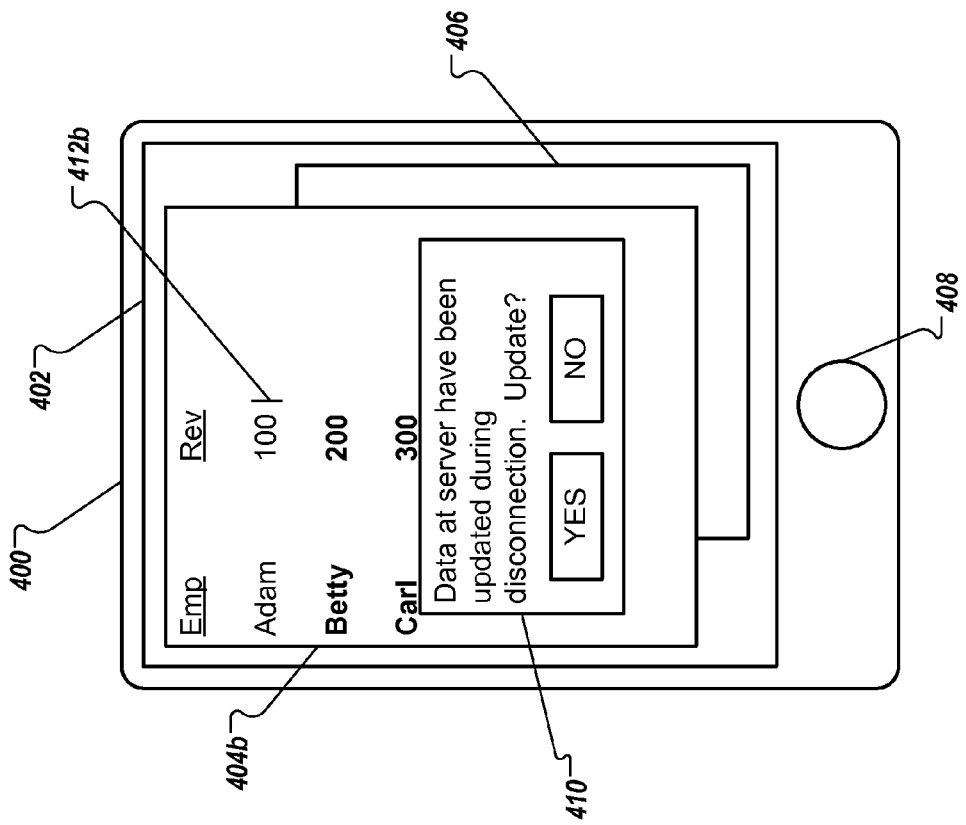
FIGS. 4A and 4B illustrate exemplary user interfaces of maintaining data states upon a forced exit of an application program.
Figure 4A:
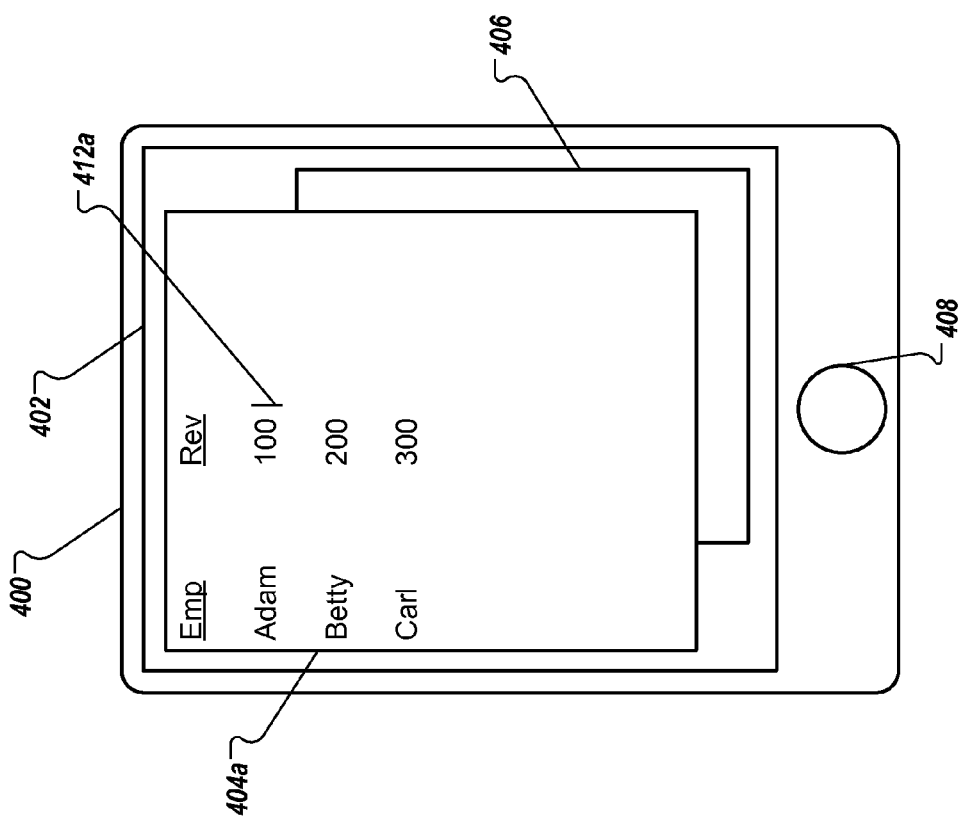

FIGS. 4A and 4B illustrate exemplary user interfaces of maintaining data states upon a forced exit of an application program. The exemplary user interfaces are described in reference to mobile device 400.

FIG. 4A illustrates mobile device 400 executing a database application program that displays a user interface on display screen 402. The user interface can include interactive content based on data retrieved from a data store. The data retrieved from the data store can be cached on mobile device 400. The interactive content can be displayed in multiple windows, e.g., window 404a and window 406. Window 404a can be displayed on top, substantially covering window 406. Display screen 402 can be a touch-sensitive display screen that is configured to receive touch inputs. For example, a touch on an uncovered portion of window 406 can bring window 406 to the top.

Data displayed in window 404a can include exemplary data records and data fields on employees and revenue associated with the employees, e.g., "Adam 100," "Betty 200," and "Carl 300." The data records can be shared data records that can be updated by multiple users. A user using mobile device 400 can update name and/or revenue values for Betty and Carl. After the update, the user moves a cursor 412a to data record "Adam 100." An event can occur that forces the application program to exit. For example, the event can be an input received from control element 408, which can be a home button. Upon receiving the event, the application program can surrender display screen 402, e.g., by giving control of display screen 402 to an operating system. The application program can store, in a time window, the data states, including states of the connections and states of cached data on a storage device.

FIG. 4B illustrates mobile device 400 that displays a user interface on display screen 402 when restoring a connection based on saved data states. Mobile device 400 can receive a request to restore the connection. For example, mobile device 400 can receive a request to re-launch the application program. Upon receiving the request, mobile device 400 can retrieve the stored data states. Using the state of connection in the stored data states, mobile device 400 can reestablish a connection to a data store. Using states of cached data in the retrieved data states, mobile device 400 can identify data cached on mobile device 400. The cached data can include, for example, data records "Adam 100," "Betty 200," and "Carl 300." Accordingly, mobile device can retrieve metadata of the cached data records from the data store.

Mobile device 400 can compare metadata retrieved from the data store with metadata stored in the data states and determine whether a conflict exists. For example, mobile device 400 can determine that data records "Betty 200" and "Carl 300" may have been updated on mobile device 400 as well as in the data store. Upon the determination, mobile device 400 can provide for display user interface 410, which can include, for example, a pop-up window that prompts the user to select whether to update the data using the current data from the server. The data records that may be updated can be provided for display in highlight.

Mobile device 400 can display the data records using display settings in the retrieved data states. For example, mobile device 400 can display window 404b and 406 according to the same relative position between window 404a and 406. Layout, zoom factor, and cursor position at time the event occurred can be reproduced. For example, cursor 412b can be provided for display at the same location in window 404b as cursor 412a in window 404a and in the same shape.

Exemplary Processes of Maintaining Data States Upon Forced Exit

Figure 5A:
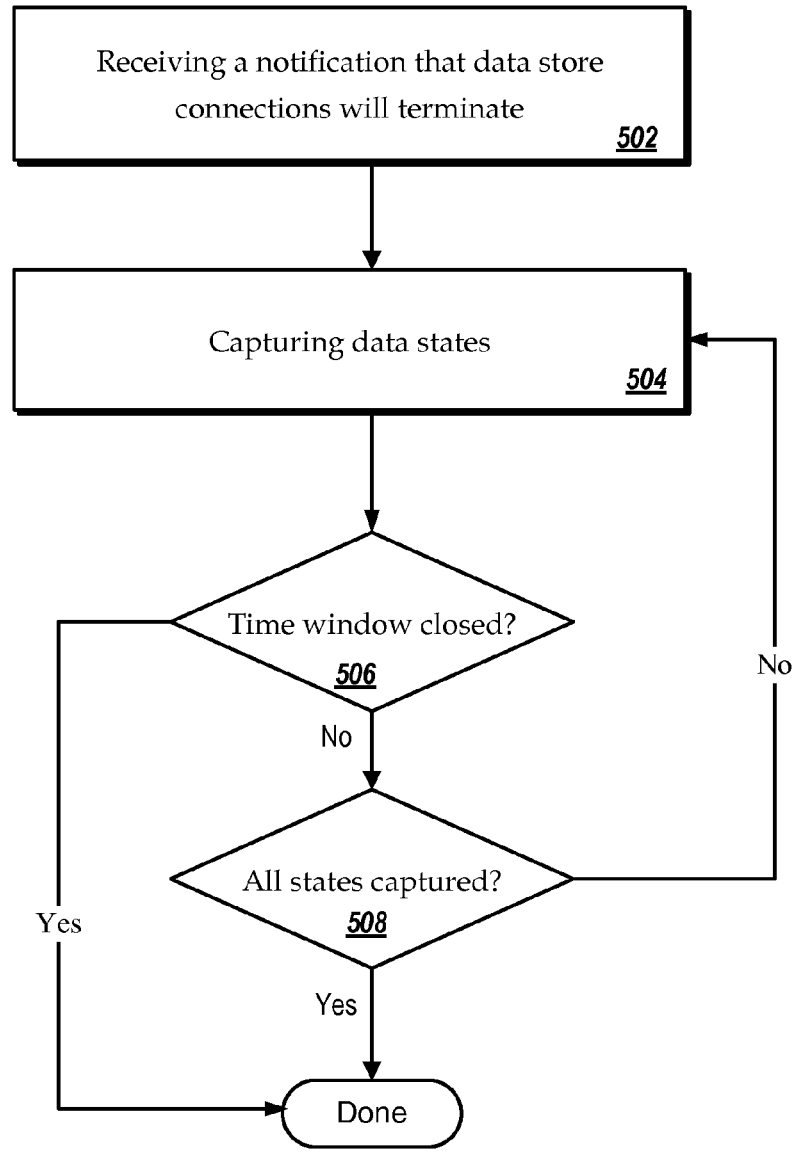
FIGS. 5A and 5B are flowcharts illustrating exemplary processes of maintaining data states upon a forced exit and restoring the data states.
Figure 5B:
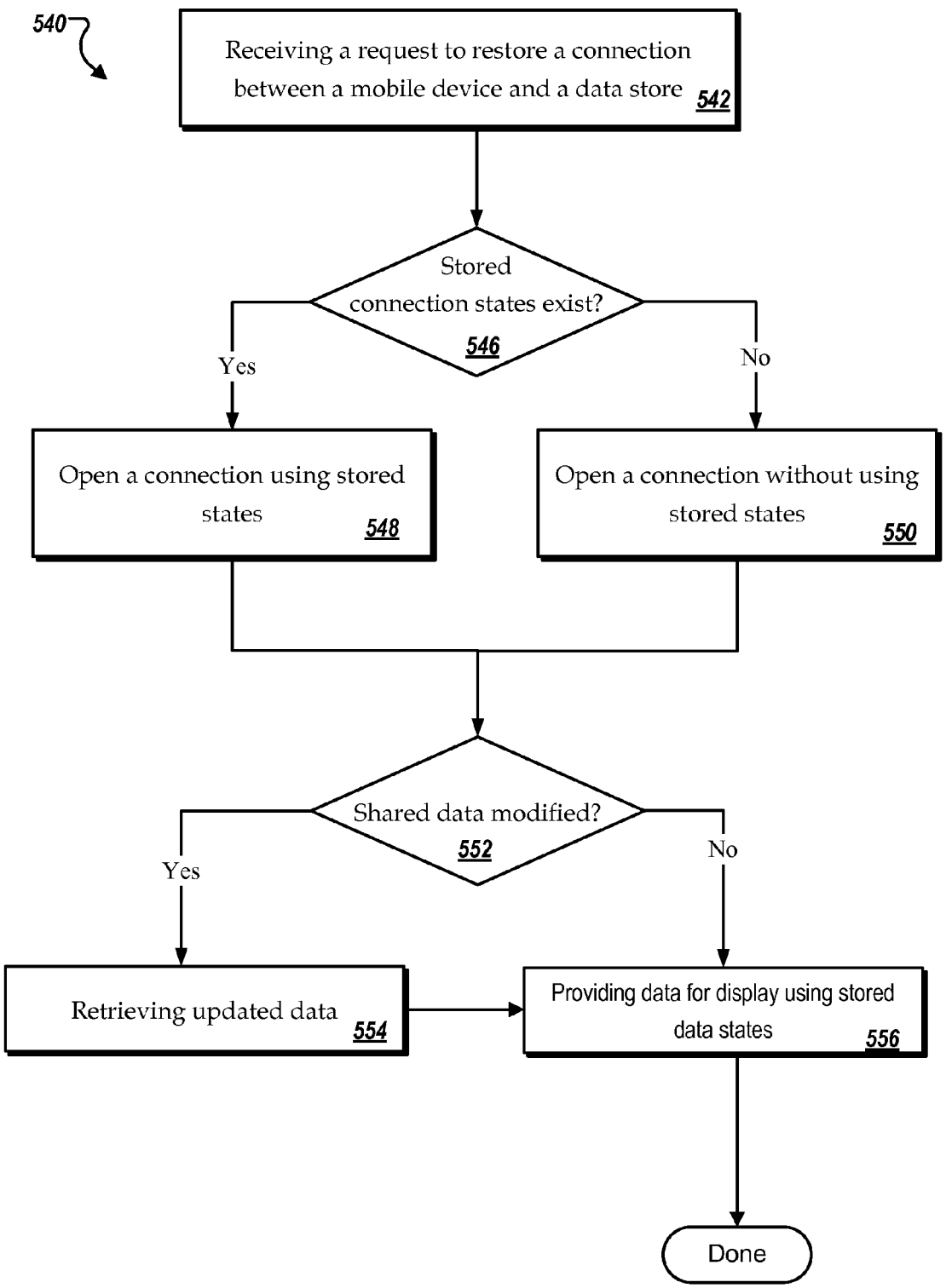

FIGS. 5A and 5B are flowcharts illustrating exemplary processes of maintaining data states upon a forced exit and restoring the data states. For convenience, the exemplary processes will be described in reference to a mobile device that implements the processes. The mobile device can be a mobile device such as mobile device 100, 200, 300, or 400 as described above in FIGS. 1-4.

FIG. 5A is a flowchart illustrating an exemplary process 500 of storing the data states. The mobile device can receive (502) a notification that one or more connections to data stores will terminate or has terminated. The notification can be a notification associated with an event that forces an application program that manages the one or more connections to exit (e.g., to surrender control of computing resources to the operating system). Alternatively or additionally, the notification can be a notification associated with a loss of connection. The notification can be received when data from the data store retrieved through the one or more connections are displayed on a display screen of the mobile device.

The mobile device can capture (504) data states upon receiving the notification. Capturing the data states can include storing various states of the connections, cached data, and display settings on a non-volatile storage device. Capturing the data states can occur in parallel, or in a sequential manner. For example, in some implementations, data states related to multiple connections can be stored sequentially, one connection at a time.

The mobile device can determine (506) whether a time window for cleaning up has closed. The time window can be associated with the event that forces an application program to exit. If the time window is closed, the application program terminates. If the time window has not closed yet, the mobile device can determine (508) whether all data states are captures. For example, the mobile device can examine a data structure registering all data store connections, and determine whether states of all connections and data associated with the connections have been preserved. Upon determining that states of all connections and data associated with the connections have been preserved, the application program can terminate. Otherwise, the mobile device continues to capture data states for a subsequent connection.

FIG. 5B is a flowchart illustrating an exemplary process 540 of restoring connection using stored the data states. A mobile device can receive (542) a request to restore a connection between the mobile device and a data store. The request can include, for example, a request to launch an application program that was forced to exit.

The mobile device can determine (546) whether stored connection states exist. Determining whether the stored data states exits can include, for example, identifying an encrypted data structure, and determining that the encrypted data structure includes states of the connection.

Upon determining that the stored states of connection exist, the mobile device can open (548) one or more connections using the stored connection states. Opening the connection using the stored connection states can include retrieving an identifier of a data store to which the mobile device can connect, and retrieving the connection parameters related to the data store from the stored connection states. The mobile device can open the connection to the data store identified by the identifier using the connection parameters. Upon determining that the stored data states do not exist, the mobile device can open (550) a new connection, if the new connection is requested by the application program.

The mobile device can determine (552) if shared data to be provided for display have been modified by other users since the application program was forced to exit. Determining if the shared data have been modified can include identifying first metadata of the shared data in locally stored states of cached data, retrieving second metadata of the shared data from the data store, and comparing the first metadata and second metadata. If the shared data were modified, the mobile device can retrieve (554) the updated data from the data store. If conflict exists, the mobile device can resolve the conflict automatically or provide a user interface for resolving the conflict.

If shared data were not modified, the mobile device can provide (556) data for display using stored data states. Providing data for display using the stored data states can include providing the data for display using display settings stored in the data states.

Figure 6:
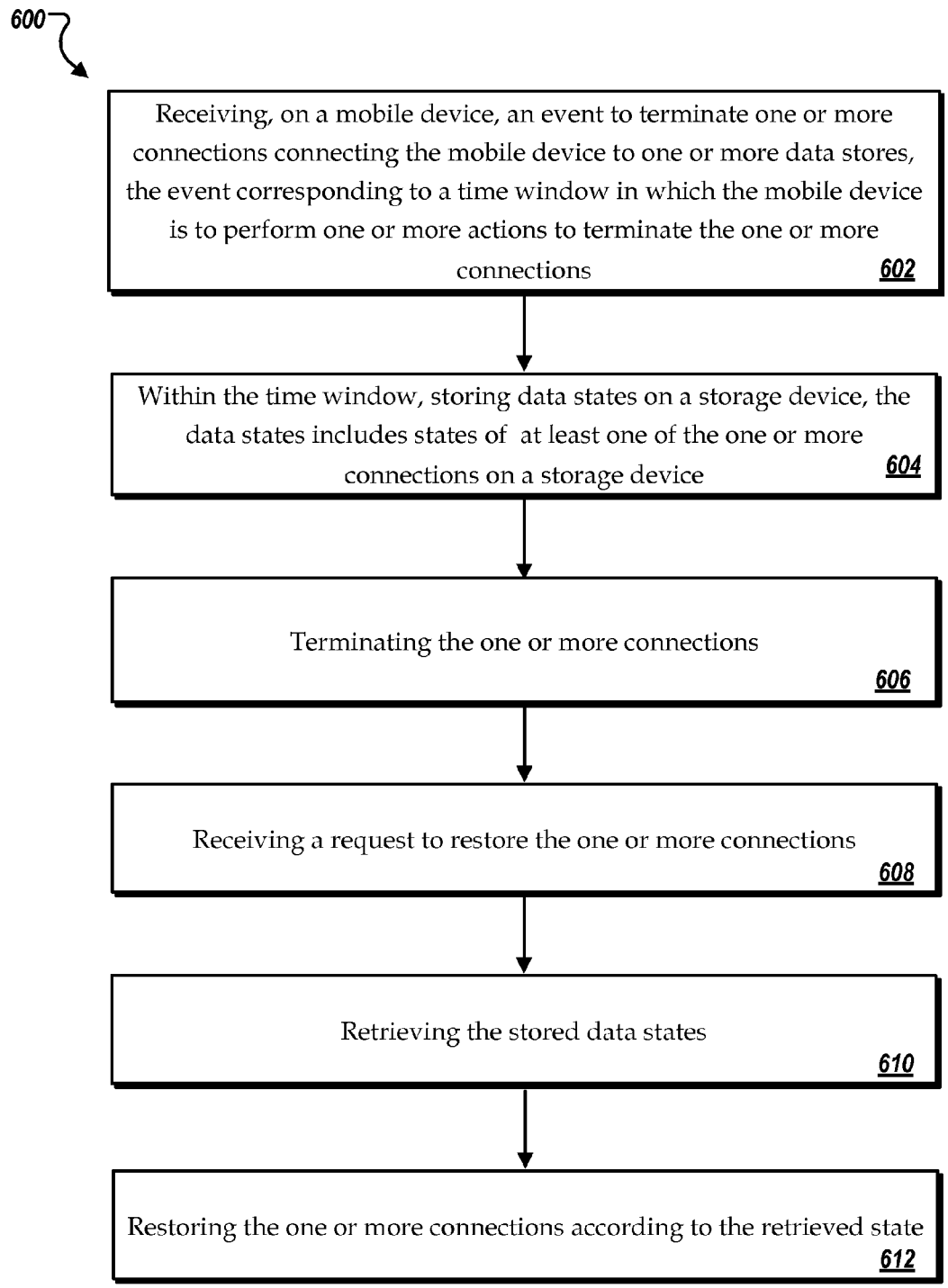
FIG. 6 is a flowchart illustrating an exemplary process of maintaining data states upon a forced exit of an application program.

FIG. 6 is a flowchart illustrating exemplary process 600 of maintaining data states upon a forced exit. For convenience, the exemplary process 600 will be described in reference to a mobile device that implements exemplary process 600. The mobile device can be a mobile device such as mobile device 100, 200, 300, or 400 as described above in FIGS. 1-4.

The mobile device can receive (602) an event to terminate one or more connections connecting the mobile device to one or more data stores. The event can correspond to a time window in which the mobile device can perform one or more actions to terminate the one or more connections. The event can include a notification of a forced exit of an application program or a loss or imminent loss of the one or more connections. The application program can be an application program that utilizes or manages the one or more connections.

In some implementations, the mobile device can determine the time window by inquiring, to an operating system of the mobile device, a time window corresponding to the forced exit of the application program. The time window can be a grace period provided by the operating system to all application programs for cleaning up, or a time window specific to the application program.

In some implementations, the data store can be connected to the mobile device through a wireless communications network. In such cases, the event to terminate one or more connections can include an indication that a loss of connection to the wireless communication has occurred or is imminent. In some implementations, the indication can include a weakening of a wireless signal of the wireless communications network indicating that a signal strength of the wireless signal will fail to satisfy a threshold. In some implementations, the indication can include an indication that the mobile device has moved or will move out of a communication range of the wireless communications network based on a projected motion path of the mobile device and a current geographic location of the mobile device.

In some implementations, the mobile device can determine the time window, including determining a projected time until connection to the wireless communications network is lost and determining the time window based on the projected time.

Within the time window, the mobile device can store (604) data states on a storage device. The data states can include states of at least one of the one or more connections. Storing the data states within the time window can include storing states of a maximum number of connections as limited by the time window. In some implementations, storing the data states can include storing states of cached data. The cached data can include a data record that is configured to be modifiable by multiple users. Storing the state of a data record can include storing an indicator indicating a number of times the data record has been updated. Storing the data states can include storing display settings for displaying data upon occurrence of the event. The display settings can include, for example, a windows setting, a zoom setting, or a position of a cursor being displayed when the event occurs.

The mobile device can terminate (606) the one or more connections. Terminating the one or more connections can occur before, during, or after the mobile device stores the data states.

Optionally, the mobile device can receive (608) a request to restore the one or more connections. The request can include, for example, an input for re-launching an application program that utilizes or manages the connections that has been forced to exit.

Upon receiving the request to restore the one or more connections, the mobile device can retrieve (610) the stored data states. Retrieving the stored data states can include reading an encrypted data structure using a decryption key that is generated based on a hardware profile of the mobile device.

The mobile device can restore (612) the one or more connections according to the retrieved states. Restoring the one or more connections can include determining that a shared data record or data field in the one or more data stores changed after the one or more connections are terminated. Upon the determining, the mobile device can refresh cached data to reflect the changed data record or data field. If a data record or field is changed both on the mobile device and in the data store, a conflict can occur. If a conflict occurs, the mobile device can provide for display a user interface for resolving the conflict. Restoring the one or more connections can optionally include applying display settings stored in the retrieved data states to displayed data, including, for example, a cursor position.

Exemplary Mobile Device Architecture

Figure 7:
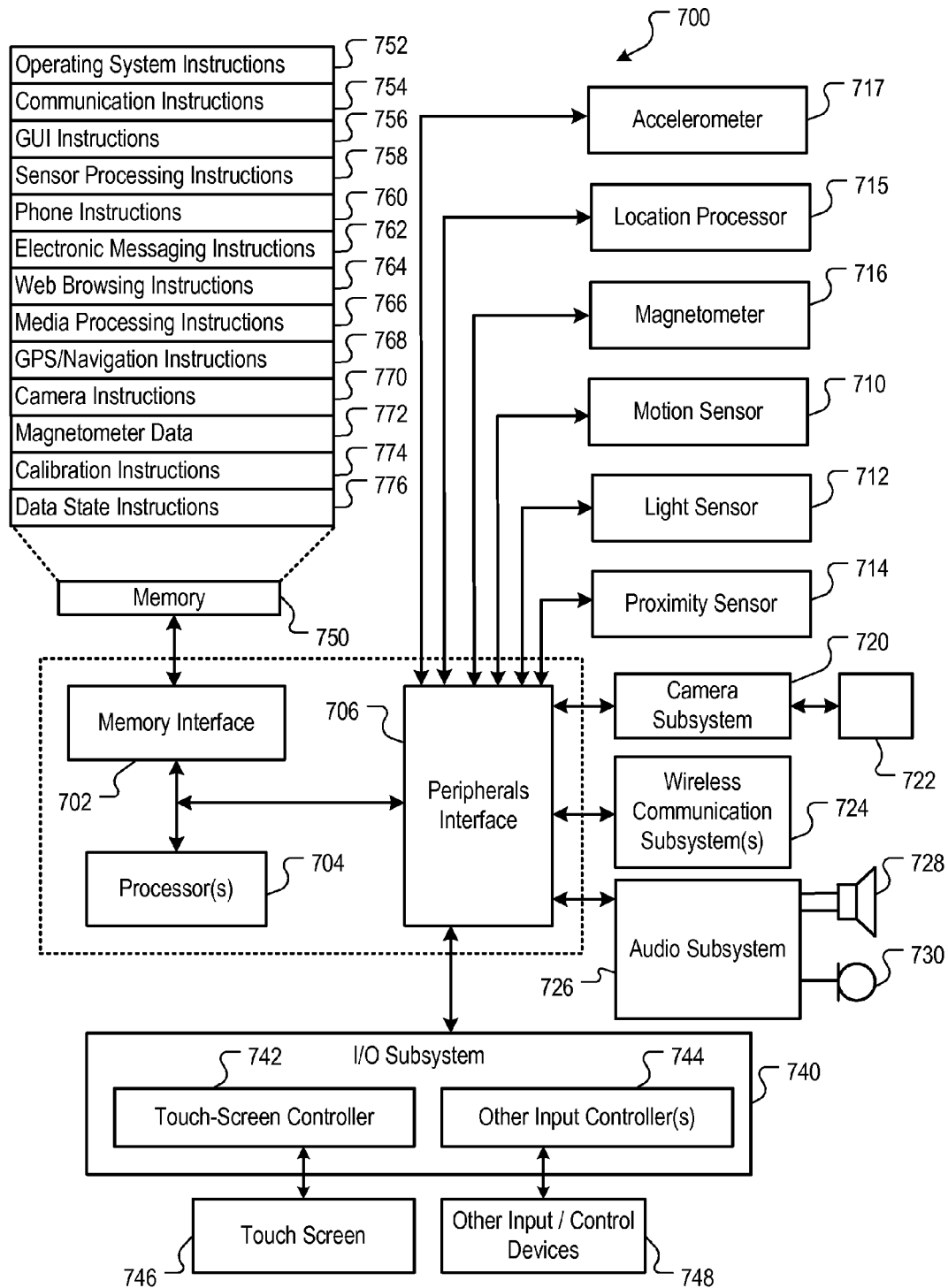
FIG. 7 is a block diagram illustrating an exemplary device architecture of a mobile device implementing the features and operations of maintaining data states upon a forced exit of an application program.

FIG. 7 is a block diagram of an exemplary architecture 700 for a mobile device implementing the features and operations of maintaining data states upon a forced exit of an application program. A mobile device (e.g., mobile device 100) can be, for example, a handheld computer, a personal digital assistant, a cellular telephone, an electronic tablet, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile device 100 can include memory interface 702, one or more data processors, image processors and/or processors 704, and peripherals interface 706. Memory interface 702, one or more processors 704, and/or peripherals interface 706 can be separate components or can be integrated in one or more integrated circuits. Processors 704 can include application processors (APs) and baseband processors (BPs). The various components in mobile device 100, for example, can be coupled by one or more communication buses or signal lines.

Sensors, devices, and subsystems can be coupled to peripherals interface 706 to facilitate multiple functionalities. For example, motion sensor 710, light sensor 712, and proximity sensor 714 can be coupled to peripherals interface 706 to facilitate orientation, lighting, and proximity functions of the mobile device. Location processor 715 (e.g., GPS receiver) can be connected to peripherals interface 706 to provide geopositioning. Electronic magnetometer 716 (e.g., an integrated circuit chip) can also be connected to peripherals interface 706 to provide data that can be used to determine the direction of magnetic North. Thus, electronic magnetometer 716 can be used as an electronic compass. Accelerometer 717 can also be connected to peripherals interface 706 to provide data that can be used to determine change of speed and direction of movement of mobile device 100.

Camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communications network(s) over which a mobile device is intended to operate. For example, a mobile device can include communication subsystems 724 designed to operate over a GSM network, a GPRS network, an EDGE network, a Wi-Fi or WiMax network, and a Bluetooth network. In particular, the wireless communication subsystems 724 can include hosting protocols such that the mobile device can be configured as a base station for other wireless devices.

Audio subsystem 726 can be coupled to a speaker 728 and a microphone 730 to facilitate voice-enabled functions, such as voice recognition, voice replication, digital recording, and telephony functions.

I/O subsystem 740 can include touch screen controller 742 and/or other input controller(s) 744. Touch-screen controller 742 can be coupled to a touch screen 746 or pad. Touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 746.

Other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of speaker 728 and/or microphone 730.

In one implementation, a pressing of the button for a first duration may disengage a lock of the touch screen 746; and a pressing of the button for a second duration that is longer than the first duration may turn power to mobile device 100 on or off. The user may be able to customize a functionality of one or more of the buttons. The touch screen 746 can, for example, also be used to implement virtual or soft buttons and/or a keyboard.

In some implementations, mobile device 100 can present recorded audio and/or video files, such as MP3, AAC, and MPEG files. In some implementations, mobile device 100 can include the functionality of an MP3 player, such as an iPod™. Mobile device 100 may, therefore, include a pin connector that is compatible with the iPod. Other input/output and control devices can also be used.

Memory interface 702 can be coupled to memory 750. Memory 750 can include high-speed random access memory and/or non-volatile memory, such as one or more magnetic disk storage devices, one or more optical storage devices, and/or flash memory (e.g., NAND, NOR). Memory 750 can store operating system 752, such as Darwin, RTXC, LINUX, UNIX, OS X, WINDOWS, or an embedded operating system such as VxWorks. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; magnetometer data 772 and calibration instructions 774 to facilitate magnetometer calibration. The memory 750 may also store other software instructions (not shown), such as security instructions, web video instructions to facilitate web video-related processes and functions, and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750. Memory 750 can include data states instructions 776 that can be used to maintain data states of one or more data connections or data records upon a forced exit of an application program utilizing the data connections.

Each of the above identified instructions and applications can correspond to a set of instructions for performing one or more functions described above. These instructions need not be implemented as separate software programs, procedures, or modules. Memory 750 can include additional instructions or fewer instructions. Furthermore, various functions of the mobile device may be implemented in hardware and/or in software, including in one or more signal processing and/or application specific integrated circuits.

Exemplary Operating Environment

Figure 8:
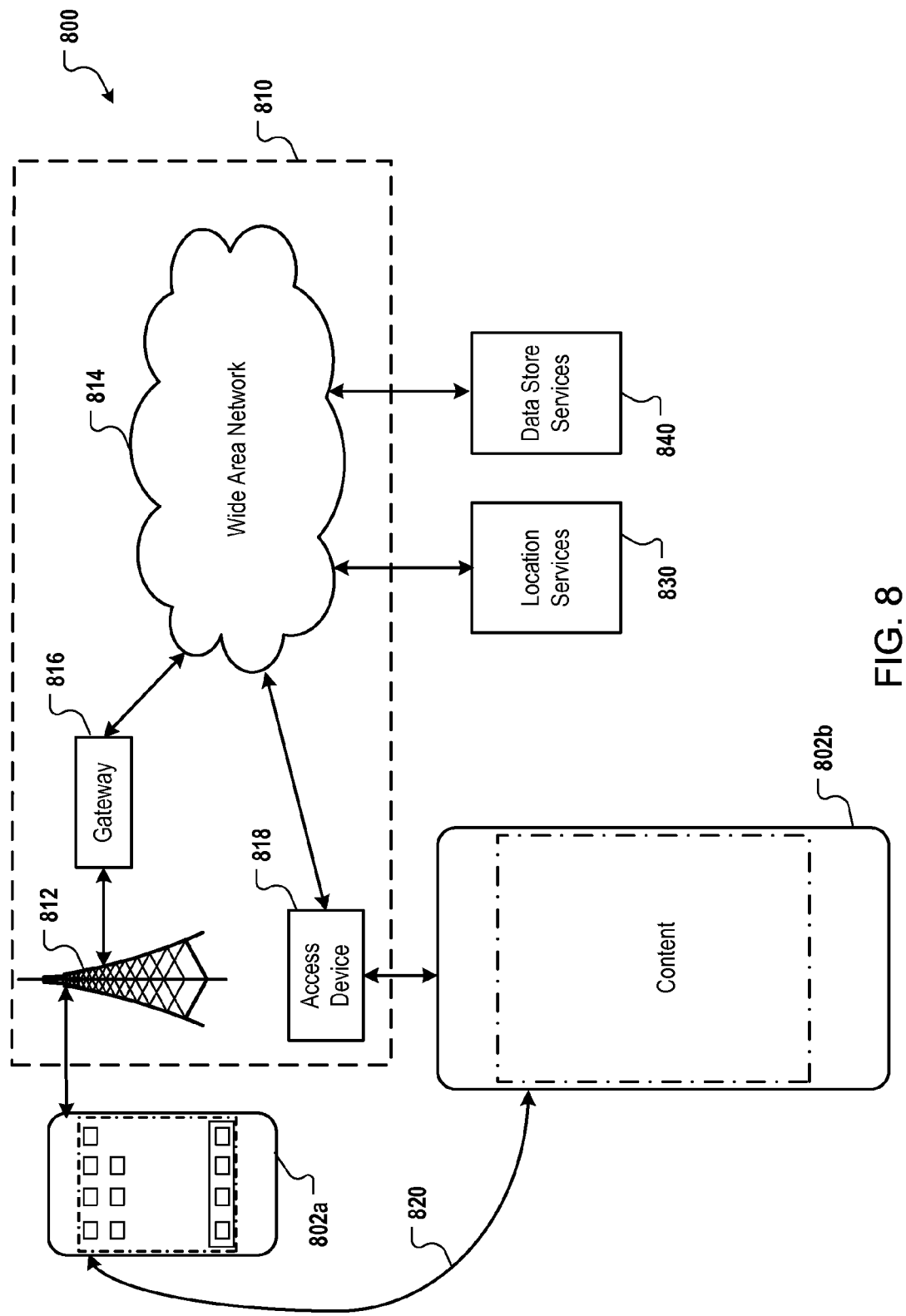
FIG. 8 is a block diagram of an exemplary network operating environment for mobile devices implementing features and operations of maintaining data states upon a forced exit of an application program.

FIG. 8 is a block diagram of an exemplary network operating environment 800 for mobile devices implementing the features and operations of maintaining data states upon a forced exit of an application program. Mobile devices 802a and 802b can be mobile device such as mobile device 100 of FIG. 1. Mobile devices 802a and 802b can, for example, communicate over one or more wired and/or wireless networks 810 in data communication. For example, a wireless network 812, e.g., a cellular network, can communicate with a wide area network (WAN) 814, such as the Internet, by use of a gateway 816. Likewise, an access device 818, such as an 802.11g wireless access device, can provide communication access to the wide area network 814.

In some implementations, both voice and data communications can be established over wireless network 812 and the access device 818. For example, mobile device 802a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 812, gateway 816, and wide area network 814 (e.g., using Transmission Control Protocol/Internet Protocol (TCP/IP) or User Datagram Protocol (UDP)). Likewise, in some implementations, the mobile device 802b can place and receive phone calls, send and receive e-mail messages, and retrieve electronic documents over the access device 818 and the wide area network 814. In some implementations, mobile device 802a or 802b can be physically connected to the access device 818 using one or more cables and the access device 818 can be a personal computer. In this configuration, mobile device 802a or 802b can be referred to as a "tethered" device.

Mobile devices 802a and 802b can also establish communications by other means. For example, wireless device 802a can communicate with other wireless devices, e.g., other mobile devices 802a or 802b, cell phones, etc., over the wireless network 812. Likewise, mobile devices 802a and 802b can establish peer-to-peer communications 820, e.g., a personal area network, by use of one or more communication subsystems, such as the Bluetooth™ communication devices. Other communication protocols and topologies can also be implemented.

The mobile device 802a or 802b can, for example, communicate with one or more services 830 and 840 over the one or more wired and/or wireless networks. For example, one or more location services 830 can determine one or more location identifiers of wireless access gateways (cell towers or wireless access points) and latitude and longitude coordinates associated with the location identifiers, and provide the one or more location identifiers to mobile devices 802a and 802b for determining current locations mobile devices 802a and 802b using the location identifiers. One or more data store services 840 can provide data services including shared data services. The data store services 840 can include service of providing metadata of shared data records, including a number of times shared data records are updated, by which users, and at what time.

Mobile device 802a or 802b can also access other data and content over the one or more wired and/or wireless networks. For example, content publishers, such as news sites, Really Simple Syndication (RSS) feeds, web sites, blogs, social networking sites, developer networks, etc., can be accessed by mobile device 802a or 802b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention. Accordingly, other implementations are within the scope of the following claims.

What is claimed is:

1. A method comprising:
executing, by a mobile device, an application program, the application program configured to receive an input from a user interface item of the mobile device that is external to the application program forcing the application program to terminate, the application program being connected to one or more data stores through one or more connections;
receiving, by the mobile device, the input forcing the application program to terminate;
upon receiving the input, inquiring, by the application program and to an operating system of the mobile device, a time window in which the application program is allowed to perform one or more actions before the application program is forced to terminate, wherein the time window includes a length of time between receiving the input and a time that the operating system revokes resources provided by the operating system to the application program;
within the time window, performing the actions, including storing data states on a storage device, the data states including states of at least one of the one or more connections; and
terminating the one or more connections.

2. The method of claim 1, wherein the user interface item is a home button of the mobile device.

3. The method of claim 1, wherein the one or more data stores are connected to the mobile device through a wireless communications network.

4. The method of claim 1, where storing the data states within the time window includes storing states of a maximum number of connections as limited by the time window.

5. The method of claim 1, where storing the data states includes storing states of cached data, the cached data include a data record that is configured to be modifiable by multiple users.

6. The method of claim 5, where storing the states of cached data includes storing an indicator indicating a number of times the data record has been updated.

7. The method of claim 1, where storing the data states includes storing display settings for displaying data upon receiving the input.

8. The method of claim 1, further comprising:
receiving a request to restore the one or more connections;
retrieving the stored data states; and
restoring the one or more connections according to the retrieved state.

9. The method of claim 8, where restoring the one or more connections comprise:
determining that a shared data record in the one or more data stores changed after the one or more connections are terminated; and
upon the determining, refreshing cached data to reflect the changed data record.

10. The method of claim 9, further comprising:
upon the determining, providing for display a user interface for resolving a conflict in the shared data record.

11. A non-transitory storage device storing computer instructions operable to cause one or more processors to perform operations comprising:
executing, by a mobile device, an application program, the application program configured to receive an input from a user interface item of the mobile device that is external to the application program forcing the application program to terminate, the application program being connected to one or more data stores through one or more connections;
receiving, by the mobile device, the input forcing the application program to terminate;
upon receiving the input, inquiring, by the application program and to an operating system of the mobile device, a time window in which the application program is allowed to perform one or more actions before the application program is forced to terminate, wherein the time window includes a length of time between receiving the input and a time that the operating system revokes resources provided by the operating system to the application program;
within the time window, performing the actions, including storing data states on a storage device, the data states including states of at least one of the one or more connections; and
terminating the one or more connections.

12. The non-transitory storage device of claim 11, wherein the user interface item is a home button of the mobile device.

13. The non-transitory storage device of claim 11, the operations further comprising:
receiving a request to restore the one or more connections;
retrieving the stored data states; and
restoring the one or more connections according to the retrieved state.

14. The non-transitory storage device of claim 11, wherein the one or more data stores are connected to the mobile device through a wireless communications network.

15. The non-transitory storage device of claim 14, wherein storing the data states includes storing display settings for displaying data upon receiving the input.

16. A system comprising:
one or more processors configured to perform operations comprising:
- executing, by a mobile device, an application program, the application program configured to receive an input from a user interface item of the mobile device that is external to the application program forcing the application program to terminate, the application program being connected to one or more data stores through one or more connections;
- receiving, by the mobile device, the input forcing the application program to terminate;
- upon receiving the input, inquiring, by the application program and to an operating system of the mobile device, a time window in which the application program is allowed to perform one or more actions before the application program is forced to terminate, wherein the time window includes a length of time between receiving the input and a time that the operating system revokes resources provided by the operating system to the application program;
- within the time window, performing the actions, including storing data states on a storage device, the data states including states of at least one of the one or more connections; and
- terminating the one or more connections.

17. The system of claim 16, wherein the user interface item is a home button of the mobile device.

18. The system of claim 16, wherein storing the data states within the time window includes storing states of a maximum number of connections as limited by the time window.

19. The system of claim 16, where storing the data states includes storing display settings for displaying data upon receiving the input.

20. The system of claim 16, the operations further comprising:
- receiving a request to restore the one or more connections;
- retrieving the stored data states; and
- restoring the one or more connections according to the retrieved state.

\* \* \* \* \*